Aug. 11, 1925.

J. C. SCHALLAN

MILKING HOPPLE

Filed Nov. 4, 1922

1,549,386

Inventor
Joseph C. Schallan.
by Orwig & Hagues Att'ys.

Patented Aug. 11, 1925.

1,549,386

UNITED STATES PATENT OFFICE.

JOSEPH C. SCHALLAN, OF HAVELOCK, IOWA.

MILKING HOPPLE.

Application filed November 4, 1922. Serial No. 599,012.

*To all whom it may concern:*

Be it known that I, JOSEPH C. SCHALLAN, a citizen of the United States, and a resident of Havelock, in the county of Pocahontas, State of Iowa, have invented a certain new and useful Milking Hopple, of which the following is a specification.

The object of my invention is to provide a milking hopple of simple, durable and inexpensive construction designed to be readily, quickly and easily applied to a cow's hind legs and tail to prevent the cow from switching her tail from side to side, and also to prevent her from kicking.

More specifically it is my object to provide a device of this kind in which each of the hooks for attachment to the cow's legs are made of the size and shape to engage only the tendon at the rear of the cow's hind leg, and to stand wholly spaced apart from the bone adjacent to the tendon, and to provide each hook with an outwardly extended arm to serve as a lever so that when the cow switches her tail from side to side, a twisting movement will be applied to the tendon, which will have the effect of training the animal to hold her tail stationary, and further if the animal should attempt to kick, the strains will be applied to the tendon only, and not the bone in such a manner as to simply twist the tendon and without danger of any injury to the animal, such as might be caused by a hook device which engages the bone portion of the cow's leg.

My invention consists in the construction, arrangement and combination of the various parts of the device, whereby the objects contemplated are attained, as hereinafter more fully set forth, pointed out in my claim, and illustrated in the accompanying drawings, in which:

Referring to the accompanying drawings I shall first describe the hook or lever device. This is preferably formed of metal and comprises a loop portion 10, the sides of which are inclined toward each other at 11 to form a narrow neck between the sides of the loop. On one end of the hook there is an outwardly projected arm 12 to form a lever. This lever extends substantially at right angles to the longitudinal axis of the loop 10, and the other end of the loop curves outwardly and is longer than the end which terminates at the lever.

Figure 1:
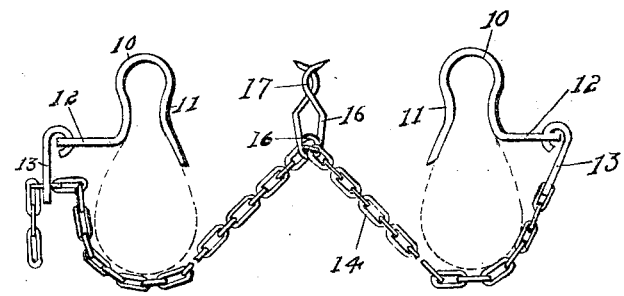
Figure 1 shows a top or plan view of my improved device with the parts in the position they would assume if applied to an animal's legs and tail. In this figure the position of the animal's legs relative to the hook is indicated by dotted lines.
Figure 2:
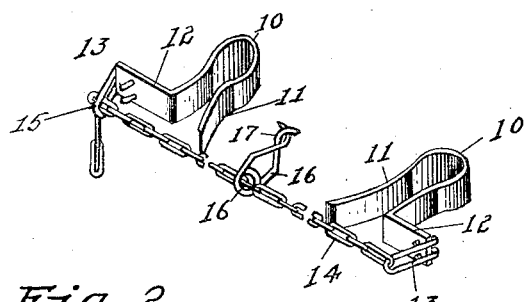
Figure 2 shows a perspective view of a device embodying my invention.

Attached to the outer end of the arm 12 is a link 13. Pivotally connected to the arm and attached to this link is a chain 14. One of the link 13 is provided with a narrow slot near its outer end, as shown at 15 in Figure 2, the purpose of which is to enable the chain to be secured to the link 13 by inserting the flat side of one of the link in the reduced portion 15. The chain may be adjusted relative to the link 13 by simply moving it back to the enlarged portion of the link 13 adjacent to the arm 12, whereupon the chain may freely slide through the link.

Mounted upon the chain 13 is a spring hook device comprising a coiled circular portion 16 to encircle the chain, and two hook shaped members 17 at the outer ends thereof. This tail holding device is operated by compressing the sides together, and then inserting the cow's tail between the hooks 17 and then releasing the pressure so that the spring will clamp the device to the cow's tail.

In practical use the operator first places one of the members 10 over the cow's tendon with the arm 12 extended outwardly from the side of the cow's legs, then the chain is passed around in front of the cow's leg and the other loop 10 is applied to the tendon on the opposite leg. The chain is then drawn tight through the link 13 and then moved to the reduced portion of the link, then the tail holder is secured to the tail in the ordinary manner.

I have demonstrated by experiment that with my improved hopple device the amount of pull that is exerted by the cow switching her tail is sufficient on account of the extension arms 12, to give a substantial twisting movement to the cow's tendons to which the device is applied, and that the animal very quickly learns to avoid this twisting motion by holding her tail stationary.

In devices of this general nature in which the attachment to the animal's legs is made to completely encircle the leg or to engage both the tendon and the bone, then the animal will continue in its attempts to switch its tail and to move its legs.

Furthermore, I have demonstrated by experiment that when my improved device is applied, and when the animal attempts to kick or rapidly move her feet, then the result is that the arm 12 functions as a lever and applies a lateral twisting movement to the tendon only, and does not engage the bone and prevents the cow from further attempts at kicking, whereas when a device of this character is applied to the cow's legs engaging the bone as well as the tendon, the animal will continue to kick and struggle, and hence the bone offers a firm resistance to the pull of the chains, and the continued struggle will tend to injure the cow, whereas with my improved device the animal is never injured no matter how violently she struggles and she rapidly learns to discontinue attempts at kicking.

I claim as my invention:

An improved animal hopple comprising in combination two hopple members each formed of a substantially U-shaped body portion, the open end being narrower than the body portion and being designed to be fitted over the tendon at the rear of an animal's hind leg, the outer end of each hook being extended laterally to a substantial distance outwardly to form a lever, said parts being made of such size that when placed on an animal's leg they will engage the tendon portion only and not the bone portion thereof, a chain connected with the said lever portions, and a cow tail holder at the central portion of the chain, substantially as described and for the purposes stated.

Des Moines, Iowa, August 22, 1922.

JOSEPH C. SCHALLAN.